US012331556B2

(12) United States Patent
Müller et al.

(10) Patent No.: US 12,331,556 B2
(45) Date of Patent: Jun. 17, 2025

(54) CLOSURE-SECURING MEANS FOR A BOTTLE

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 48 days.

(21) Appl. No.: 17/439,317

(22) PCT Filed: Mar. 4, 2020

(86) PCT No.: PCT/EP2020/055728
§ 371 (c)(1),
(2) Date: Sep. 14, 2021

(87) PCT Pub. No.: WO2020/200618
PCT Pub. Date: Oct. 8, 2020

(65) Prior Publication Data

US 2025/0043597 A1 Feb. 6, 2025

(30) Foreign Application Priority Data

Apr. 3, 2019 (DE) ..................... 10 2019 204 781.5

(51) Int. Cl.
*E05B 73/00* (2006.01)
*E05B 47/00* (2006.01)
(Continued)

(52) U.S. Cl.
CPC ...... *E05B 73/0041* (2013.01); *E05B 47/0009* (2013.01); *E05B 47/0011* (2013.01);
(Continued)

(58) Field of Classification Search
CPC ...... E05B 39/00; E05B 41/00; E05B 47/0009; E05B 47/0011; E05B 47/0038;
(Continued)

(56) References Cited

U.S. PATENT DOCUMENTS 7,372,363 B2 * 5/2008 Durbin ................ E05B 73/0041 340/568.1
7,394,376 B1 * 7/2008 Sayegh ............... E05B 73/0041 340/572.1
(Continued)

FOREIGN PATENT DOCUMENTS

WO 2019023582 A1 1/2019

OTHER PUBLICATIONS

International Application No. PCT/EP2020/055728, International Search Report and Written Opinion, Jun. 17, 2020, 14 pages.

*Primary Examiner* — Christopher J Boswell
(74) *Attorney, Agent, or Firm* — Kilpatrick Townsend & Stockton LLP

(57) ABSTRACT

The present invention relates to a closure guard for a bottle, comprising a first housing part and a second housing part, which are configured to non-releasably enclose an upper portion of the neck of the bottle to be secured, including the bottle closure, when in a securing state, wherein the first housing part and the second housing part are interconnected so as to be movable relative to one another and are transferable between the securing state and a release state, in which the closure guard can be released from the neck, and a locking mechanism which is associated with either the first housing part or the second housing part and is configured to lock the first housing part and the second housing part in the securing state.

19 Claims, 3 Drawing Sheets

(51) Int. Cl.
*E05B 17/22* (2006.01)
*E05B 39/04* (2006.01)

(52) U.S. Cl.
CPC ............. *E05B 17/226* (2013.01); *E05B 39/04* (2013.01); *E05B 2047/0058* (2013.01); *E05B 2047/0094* (2013.01)

(58) Field of Classification Search
CPC ........... E05B 47/004; E05B 2047/0058; E05B 73/0017; E05B 73/0041; E05B 73/0047
See application file for complete search history.

(56) References Cited

U.S. PATENT DOCUMENTS

| | | | | |
|---|---|---|---|---|
| 8,269,631 | B2 * | 9/2012 | Yang | E05B 73/0041 340/572.1 |
| 8,416,082 | B2 * | 4/2013 | Sayegh | E05B 73/0041 70/57.1 |
| 9,206,628 | B2 * | 12/2015 | Zhang | E05B 73/0041 |
| 9,311,797 | B2 * | 4/2016 | Yang | E05B 73/0041 |
| 9,472,073 | B2 * | 10/2016 | Yang | E05B 73/0041 |
| 9,576,453 | B2 * | 2/2017 | Strassburger | E05B 73/0041 |
| 10,240,368 | B2 * | 3/2019 | Necchi | E05B 73/0041 |
| 11,993,958 | B2 * | 5/2024 | Müller et al. | E05B 73/0041 |
| 2008/0284601 | A1 * | 11/2008 | Sayegh | E05B 73/0041 340/572.1 |
| 2011/0219828 | A1 | 9/2011 | Zhang et al. | |
| 2015/0137977 | A1 | 5/2015 | Yang | |
| 2016/0321894 | A1 | 11/2016 | Schneider | |
| 2017/0175426 | A1 | 6/2017 | Piccoli | |
| 2017/0342747 | A1 * | 11/2017 | Sayegh | E05B 73/0041 |

* cited by examiner

CLOSURE-SECURING MEANS FOR A BOTTLE

CROSS REFERENCE TO RELATED APPLICATION

This application is a U.S. national phase of International Patent Application No. PCT/EP2020/055728 filed on Mar. 4, 2020, which claims priority to German Patent Application No. 10 2019 204 781.5, filed in Germany on Apr. 3, 2019. The entire contents of both applications are hereby incorporated herein by this reference.

The present invention relates to a closure guard for a bottle, comprising a first housing part and a second housing part, which are configured to non-releasably enclose an upper portion of the neck of the bottle to be secured, including the bottle closure, when in a securing state, the first housing part and the second housing part being interconnected so as to be movable relative to one another and being transferable between the securing state and a release state, in which the closure guard can be released from the neck, the closure guard further comprising a locking mechanism which is associated with either the first or the second housing part and is configured to lock the first housing part and the second housing part in the securing state.

Various applications are conceivable for bottle closure guards of this kind, some of which are already being implemented in practice. Firstly, they can be used as anti-theft devices for merchandise, as have been used for many years in the field of department stores open to the public, where they provide sufficient protection against unauthorized removal from a demarcated sales area within said store of merchandise sold therein. For this purpose, generic closure guards of this kind are provided with an anti-theft element, such as an RFID chip or an electronic article surveillance (EAS) unit, which is configured to interact with an external anti-theft system, such as a transceiver unit for electromagnetic radiation of a suitable wavelength, such that when the closure guard equipped with the RFID chip or EAS unit passes by said system, a signal is generated and an alarm can be triggered, this alarm being able to be triggered both at the exit of the department store on the external anti-theft system and optionally also by suitable means on the closure guard itself.

Accordingly, once a bottle equipped with a generic closure guard of this kind has been purchased, said closure guard must be removed therefrom in order to avoid false alarms. Up to now, this has usually been done through manual intervention by a cashier, who disassembles the closure guard from a purchased bottle, if necessary with the aid of a tool, so that it can be taken out of the sales area. Assuming that "self-checkout" systems will become more widespread in the future, whereby a potential buyer can purchase a product autonomously in a sales area using a software application on a mobile terminal, without the need to interact with a human cashier in order to do so, closure guards of this kind will, however, lose their practicality as it will be necessary to find a mechanism that is compatible with this kind of system and allows the user themselves to remove the closure guard from a bottle purchased in this way, ideally without the use of further tools.

However, a further application of bottle closure guards of this kind may also be, for example, where bottles containing alcoholic beverages are to be publicly displayed but, at the same time, unauthorized persons need to be prevented from accessing the contents of the bottles. This could be in restaurants or bars which would like to visibly display their beverage bottles to their guests but must still prevent guests from autonomously removing contents from the bottle when not being watched.

On the other hand, situations like this may also arise in private households where, for example, visually appealing wine or spirits bottles are to be showcased but minors must be prevented from accessing the beverages within them. In these applications, too, it is necessary or at least desirable in each case to be able to release the corresponding closure guard from the neck quickly when necessary, and ideally without any additional tools. Furthermore, it goes without saying that closure guards of this kind must be sufficiently solid so that they cannot be forcibly removed from the neck with little force.

An example of a generic closure guard of this kind is known from US 2016/0321894 A1, in which a multi-part housing having a complicated closing mechanism is used, in which a needle is held by a pair of displaceable balls, thereby wedging the closure guard onto the neck. Due to its complex design, however, this closure guard is relatively expensive and it is questionable whether the closure mechanism referred to can provide sufficiently high resistance to unauthorized removal of the closure guard from the neck.

Moreover, US 2014/0191871 A1 further discloses an annular anti-theft device for a bottle, which is wrapped around the neck in the manner of a cable tie. Here, too, however, it is debatable whether this design can apply sufficient resistance forces against unauthorized removal, especially since an additional cover for the bottle closure is only placed on, meaning that in some circumstances the anti-theft device could remain on the neck but, for example, a cork could be pulled out of the bottle by merely levering off the cover of the anti-theft apparatus.

The object of the present invention is therefore to provide a robust closure guard of the generic type which is nevertheless relatively inexpensive to manufacture and can be combined with modern access mechanisms.

For this purpose, according to the invention the locking mechanism of the present closure guard comprises a locking pin which engages with both the first housing part and the second housing part in the securing state in order to fix said housing parts in place in their relative orientation, and which can be displaced, by means of an actuation element, out of engagement with at least one of the first housing part and the second housing part in order to allow the first housing part and the second housing part to be transferred to the release state.

By thus providing direct engagement of the locking pin of the locking mechanism with the two housing parts in the securing state, substantially improved robustness of the closure guard is achieved compared with the known prior art, and moreover this can be achieved with fewer moving parts. In particular, the locking mechanism can comprise any other components, such as electronic components for communicating with external terminals, as well as suitable actuation elements of various configurations; all that needs to be ensured is that the locking pin can be engaged with the two housing parts and guided out of them again.

To ensure the closure guard is locked securely and non-releasably in the securing state, the locking pin can be biased toward its engagement position by a first resilient element, for example a spring, in particular a helical spring. Before the closure guard is transferred from the securing state to the release state, therefore, the locking pin of the locking mechanism must first be displaced by the actuation element out of engagement with one of the two housing parts, counter to the action of the first resilient element.

Although different configurations of actuation elements may be used in the closure guard according to the invention, in a particularly preferred embodiment the actuation element may comprise an actuator which is formed at least in part by a shape-memory alloy and/or a piezoelectric element. Shape-memory alloys are metal alloys that change shape, for example become longer, when transitioning from a first crystalline structure to a second crystalline structure. A transition of this kind between the two crystalline structures can be triggered in particular by a temperature increase or the application of an electrical voltage; as a result of this phase transformation, very large forces can be exerted without fatigue over a large number of transformation cycles. A temperature increase in particular can be implemented in a simple manner in the closure guard according to the invention by suitable electrical and electronic means.

Although dedicated elements may, for example, be provided on the first housing part and the second housing part for engagement with the locking pin in the securing state, in a particularly simple embodiment a respective opening may be provided in both the first housing part and the second housing part, the locking pin being guided through each of said openings in the securing state in order to fix said housing parts in place against one another.

Likewise, there are various conceivable embodiments for ensuring relative mobility of the first housing part and the second housing part with respect to one another between the securing state and the release state. One possible option is to interconnect the first housing part and the second housing part so as to be linearly movable with respect to one another, in particular by means of a sliding guide, while on the other hand the first housing part and the second housing part could be interconnected so as to be pivotably movable with respect to one another by means of a hinge, in which case the pivot pin of the hinge could be arranged above or in parallel with the neck in the securing state.

In any case, the first housing part and the second housing part could be biased toward their release state by a second resilient element, for example a spring, in particular a helical spring. In this way, when the actuation element for guiding the locking pin out of engagement with one of the two housing parts is actuated, the closure guard can be automatically opened into its release state, and this can lead to improved handling of the closure guard according to the invention, particularly when used in retail.

By way of example, to allow a potential retail customer to have a look at the product before making a purchase (in the case of a wine bottle, for example, to have a look at the condition of the capsule or cork), at least one of the first housing part and the second housing part can be made of a transparent material, for example a hard transparent plastics material, in at least some portions. However, it goes without saying that non-transparent materials could also be used in other variants of the closure guard according to the invention; where metal is used, the closure guard may, in some cases, have even greater resistance to unwanted removal than in the case of plastics materials.

Furthermore, for the closure guard to non-releasably enclose the neck, the closure guard may comprise at least one barb element, which is associated with either the first housing part or the second housing part and is configured to interact with a bead on the neck when the closure guard is in the securing state in such a way as to prevent the closure guard from being pulled off the neck. Alternatively, however, the non-releasable enclosing can also be achieved in other ways in variants of the closure guard, for example by the two housing parts themselves being in form-fitting contact with the neck over a large surface area.

Where a barb element is provided, it can be displaceably or pivotably associated with the corresponding housing part and may be biased in the direction of the neck by a third resilient element. As a result of this measure, the closure guard can be placed on the neck in both its securing state and its release state; in the securing state, when the closure guard is pushed over the neck from above, the at least one barb element is first deflected away from the neck by the bead on the neck, counter to the action of the third resilient element, and, once it has passed over the bead, it is pushed backward behind said bead by the action of the third resilient element, and can deploy its barb function here. In this way, the closure guard can also be placed on the neck with one hand, which can significantly simplify the securing process.

By contrast, positioning of the closure guard on the neck in the release state, the two housing parts can be transferred to the securing state in a simple manner by accordingly moving the two housing parts relative to one another if the at least one barb element is already located below the bead on the neck.

Although different ways in which the actuation element can transfer the locking pin are conceivable, electromechanical actuation may be preferred because this is the easiest to integrate with a modern opening system. For this purpose, the closure guard may further comprise a power supply unit, such as a battery. However, other configurations are also conceivable, for example providing the closure guard so as to have an antenna for picking up electrical power by means of induction; in that case, though, to open the closure guard it must be brought into the vicinity of an appropriate transmitter and is therefore less self-sufficient and less suitable for some conceivable applications.

Alternatively or additionally, the closure guard according to the invention can further comprise a signal-receiving unit, which is operatively coupled to the actuation element and configured, upon receipt of a release-initiation signal, to instruct the actuation element to displace the locking pin out of engagement with at least one of the first housing part and the second housing part. In this case, the release-initiation signal can be transmitted from any suitable terminal, for example by a mobile terminal of a user, such as a cell phone or smartwatch, in the above-mentioned self-checkout department store scenario, or by a permanent dedicated station. Also conceivable are wired solutions, in which physical contact must be made between the closure guard and an apparatus for transmitting the release-initiation signal, or an operator interface could also be provided on the closure guard itself, for example for entering a release code.

Furthermore, the closure guard according to the invention could comprise a storage unit configured to store information about the bottle to be secured and/or the number of times the actuation element has been actuated and/or further data. Access to this stored data could be established in the manner described above by way of a bidirectional wireless or wired data link to any suitable terminals.

Furthermore, the closure guard according to the invention could also be provided with an indicator apparatus on the outside of the first or the second housing part; this indicator apparatus could display any information about either the state of the closure guard itself or the bottle enclosed by it, and, for this purpose, could also be provided with or operatively coupled to suitable data processing means.

In this context, the closure guard according to the invention could further comprise at least one sensor unit configured to detect the establishment of the securing state, the release state, and/or a state attached to a bottle. The sensor data obtained in this way can be used or processed further in a wide variety of ways, for example to generate statistics or monitor the individual guards in a department store.

Furthermore, alternatively or additionally, the closure guard itself could be equipped with an alarm generator, such as a speaker, which can emit an alarm, for example through interaction with the above-mentioned sensor or another sensor, when it detects a tampering attempt or when it leaves a sales area, etc.

As briefly mentioned above, the closure guard according to the invention could additionally comprise an anti-theft element configured to interact with an external anti-theft system.

Further features and advantages of the present invention will become apparent from the following description of embodiments thereof when considered together with the accompanying drawings, in which.

Figure 1A:
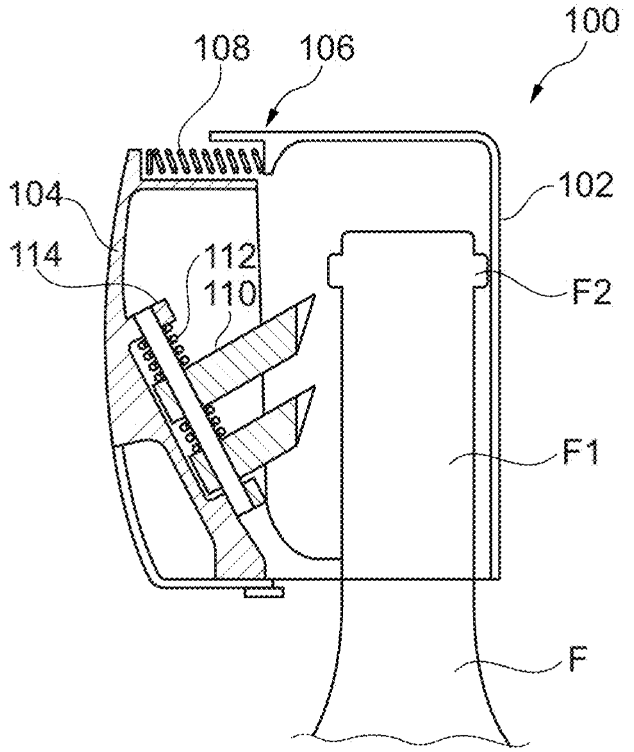
FIGS. 1A and 1B show a first embodiment of a closure guard according to the invention in its release state and its securing state, respectively.
Figure 1B:
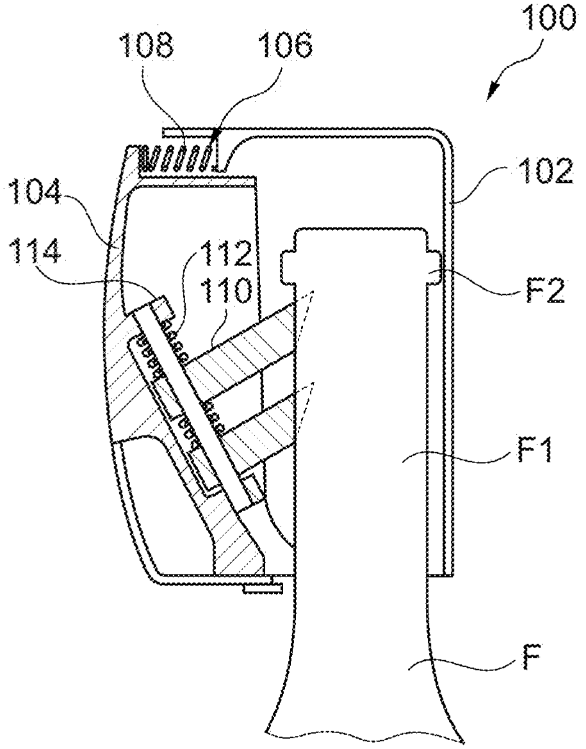

Firstly, FIGS. 1A and 1B show a first embodiment of a bottle closure guard according to the invention, denoted in general by reference sign 100. The closure guard 100 comprises a first housing part 102 and a second housing part 104, which are interconnected so as to be linearly movable with respect one another by means of a sliding guide 106.

In the state shown in FIG. 1A, the first housing part 102 and the second housing part 104 are at a maximum distance from one another, so this state corresponds to a release state within the meaning of the invention. Furthermore, a helical spring 108 biases the two housing parts 102, 104 into the release state shown in FIG. 1A. In addition, it can be seen that the closure guard 100 is placed on a neck F1 of a bottle F, which further has a bead F2 at the top end in the region of its bottle closure.

To non-releasably attach the closure guard 100 in the securing state shown in FIG. 1B by engaging with said bead F2, the closure guard 100 further comprises a barb element 110, which is associated with the second housing part 104 and tapers obliquely upward on the neck F1 so as to contact the bead F2 from below in the state shown in FIG. 1B and prevent the closure guard 100 from being pulled upward off the neck F1. By means of a further helical spring 112, the barb element 110, which is displaceably held on a linear guide 114, is biased in the direction of the neck F1 such that, on the one hand, secure contact of the barb element with the neck F1 is ensured in the securing state in FIG. 1B, thus ensuring that the closure guard 100 is securely fixed in place on the bottle F, while on the other hand deflecting the barb element 110 counter to the action of the helical spring 112 allows the closure guard 100 to be pushed over the neck F1 even when the closure guard 100 is in the securing state, since in this case the barb element 110 is initially deflected away from the neck F1 by the bead F2, counter to the action of the helical spring 112, and can come to rest behind the bead F2 once it has passed over the bead.

Figure 2A:
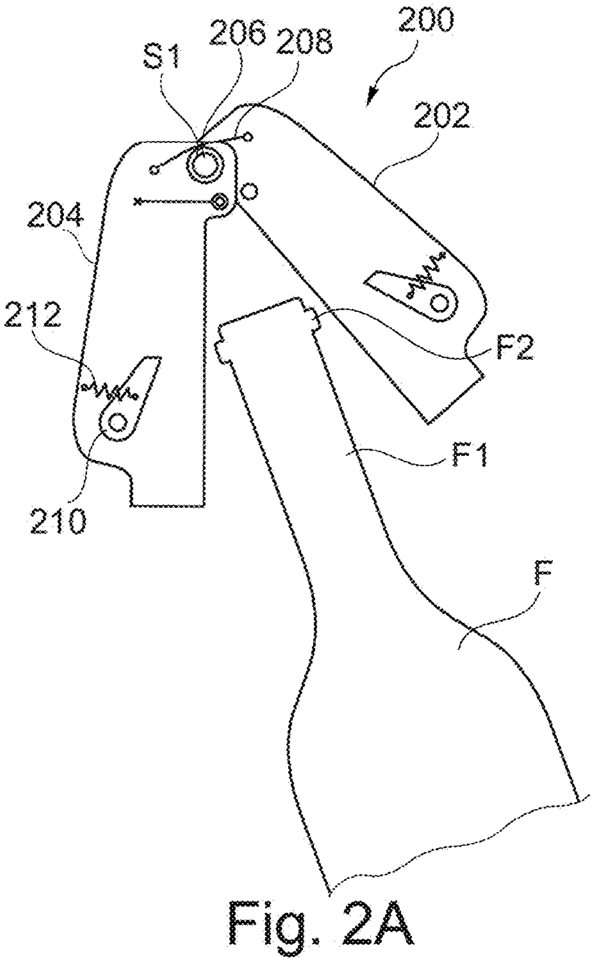
FIGS. 2A and 2B show a second embodiment of a closure guard according to the invention in its release state and its securing state, respectively.
Figure 2B:
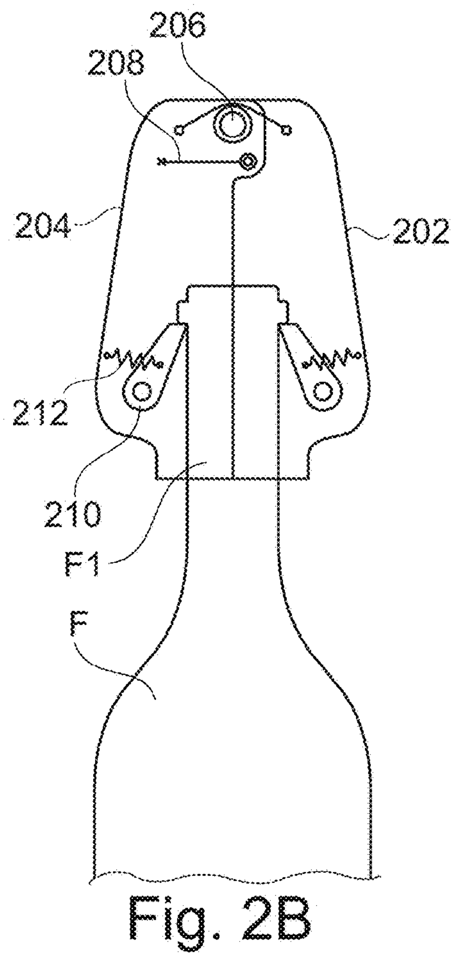

FIGS. 2A and 2B now show a second embodiment of a closure guard according to the invention, denoted by reference sign 200. By contrast with the first embodiment shown in FIGS. 1A and 1B, in this case the two housing parts 202, 204 are not fastened to one another so as to be linearly displaceable with respect to one another, but rather can be pivoted with respect to one another by means of a hinge 206 having a pivot pin S1. In this case, a tension spring 208 is also provided, which biases the two housing parts 202, 204 into the release state shown in FIG. 2A in a loading direction.

A further difference between the second embodiment 200 and the first embodiment 100 of a closure guard according to the invention is that the barb elements 210, of which one is associated with the first housing part 202 and one with the second housing part 204 in the embodiment in FIGS. 2A and 2B, are not mounted on a linear guide either, but rather are likewise each attached to their respective housing part so as to be pivotable about corresponding pivot pins S210. In this case, the two barb elements 210 are again biased in the direction of the neck F1 of the bottle F by the action of springs 212, such that a secure hold of the closure guard 200 on the bottle F is ensured in the securing state shown in FIG. 2B.

Figure 3A:
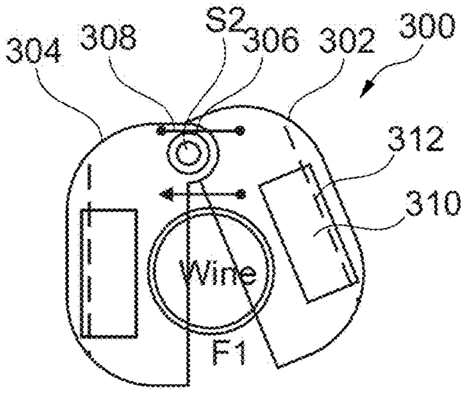
FIGS. 3A and 3B show a third embodiment of a closure guard according to the invention in its release state and its securing state, respectively.
Figure 3B:
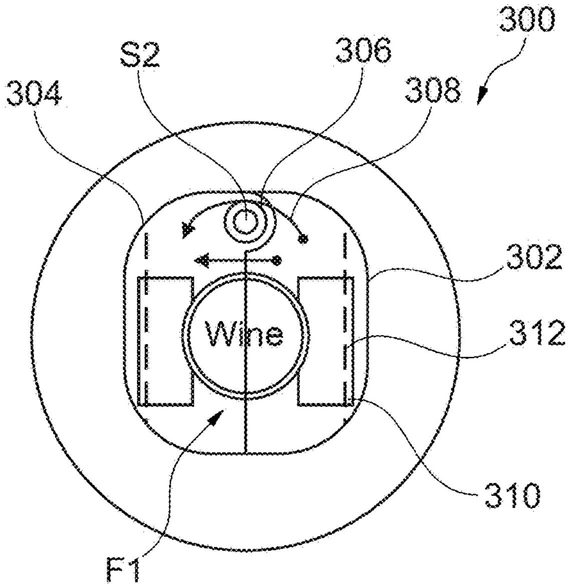

Furthermore, FIGS. 3A and 3B show a third embodiment of a closure guard according to the invention, denoted by reference sign 300 and shown in a schematic top view in FIGS. 3A and 3B. Although the two housing parts 302, 304 are again interconnected so as to be pivotable about a pivot pin S2 by means of a hinge 306 and are biased in the direction of a release position by a resilient element 308, this pivot pin S2 is, by contrast with the pivot pin S1 in FIGS. 2A and 2B, not arranged above the bottle F but runs in parallel with and next to the neck F1. Apart from this difference in the position and orientation of the corresponding pivot pin, the two embodiments in FIGS. 2A and 2B and FIGS. 3A and 3B are substantially identical, so no further description of the additional components, in particular also of the indicated barb elements 310 and their associated springs 312, is provided at this juncture.

Figure 4A:
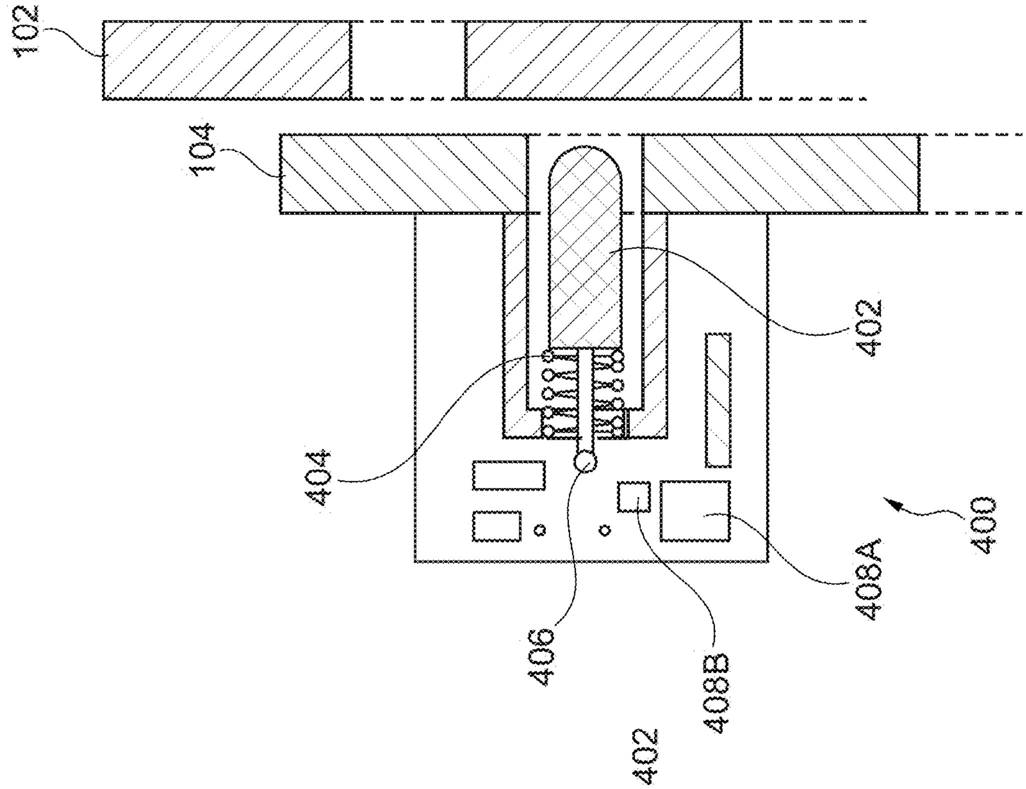
FIGS. 4A and 4B are detailed views of the locking mechanism from the first to third embodiments in its release state and its securing state, respectively.
Figure 4B:
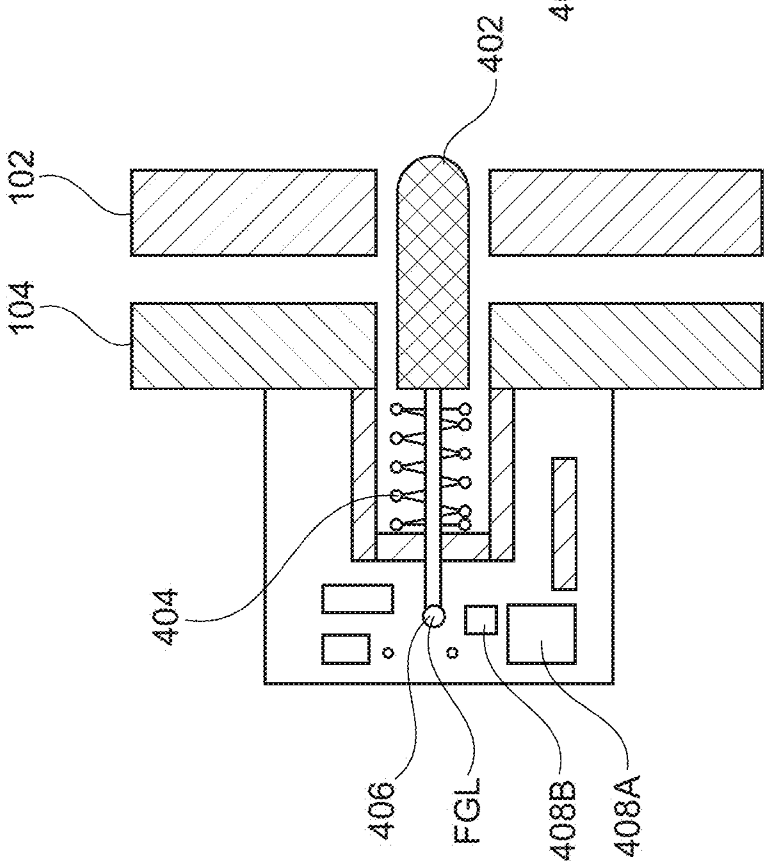

Lastly, FIGS. 4A and 4B show the locking mechanism (denoted by reference sign 400) used in the embodiments 100, 200, 300, by means of which the respective pairs of housing parts can be fixed in place on one another in the securing state.

Again, FIG. 4A shows the locking mechanism 400 in a state corresponding to the release state of the corresponding closure guard, while FIG. 4B shows the same locking mechanism 400 in a state corresponding to the securing state of the corresponding closure guard. For simplicity, the two housing parts between which the locking pin 402 of the locking mechanism 400 engages are denoted by reference signs 102 and 104 so as to match the first housing part and the second housing part in FIGS. 1A and 1B, but it goes without saying that a corresponding locking mechanism 400 may also be provided at suitable locations in the other embodiments 200, 300 of closure guards according to the invention.

Respective openings 102*a*, 104*a* are provided in the two housing parts 102, 104, through which openings the locking pin 402 extends in the securing state so as to fix the relative position between the first housing part and the second housing part 102, 104. By contrast, in FIG. 4A the locking pin 402 merely protrudes into the opening 104*a* in the second housing part, to which the locking mechanism 400 is attached, so it is clear that relative movement between the first housing part 102 and the second housing part 104 is readily possible.

In addition to the aforementioned locking pin 402, the locking mechanism 400 further comprises a helical spring 404, which biases the locking pin 402 into the engagement position shown in FIG. 4B. If the locking pin 402 is now to be moved out of engagement with the first housing part 102 counter to the action of the helical spring 404, i.e., is to be moved out of the state in FIG. 4B to the state in FIG. 4A, the shape-memory alloy 406 acting as the actuation element must be made to contract in order to displace the locking pin 402 away from the first housing part 102 until it emerges from the opening 102*a*. To initiate this actuation, the locking mechanism 400 further comprises electronic components 408, in particular a signal-receiving unit 408*a*, by means of which release-initiation signals can be received from an external apparatus, as well as a battery 408*b*, which provides the energy for operating the signal-receiving unit and the actuation element.

The invention claimed is:

1. Closure guard for a bottle, comprising:

a first housing part and a second housing part, which are configured to non-releasably enclose an upper portion of the neck of the bottle to be secured, including the bottle closure, when in a securing state;

the first housing part and the second housing part being interconnected so as to be movable relative to one another and being transferable between the securing state and a release state, in which the closure guard can be released from the neck; and a locking mechanism, which is associated with either the first housing part or the second housing part and configured to lock the first housing part and the second housing part in the securing state, wherein the locking mechanism comprises a locking pin which engages with both the first housing part and the second housing part when in the securing state in order to fix said housing parts in place in their relative orientation, and which can be displaced, by means of an actuation element, out of engagement with at least one of the first housing part and the second housing part in order to allow the first housing part and the second housing part to be transferred to the release state, and wherein the actuation element comprises an actuator which is formed at least in part by a shape-memory alloy and/or a piezoelectric element.

2. Closure guard according to claim 1, wherein the locking pin is biased toward its engagement position by a first resilient element.

3. Closure guard according to claim 2, wherein the first resilient element is a spring.

4. Closure guard according to claim 1, wherein, in the securing state, the locking pin is guided through a respective opening in both the first housing part and the second housing part in order to fix said housing parts in place against one another.

5. Closure guard according to claim 1, wherein the first housing part and the second housing are interconnected so as to be linearly movable with respect to one another.

6. Closure guard according to claim 5, wherein the first housing part and the second housing part are interconnected by means of a sliding guide.

7. Closure guard according to claim 1, wherein the first housing part and the second housing part are interconnected so as to be pivotably movable with respect to one another by means of a hinge, wherein the pivot pin of the hinge may be arranged above or in parallel with the neck in the securing state.

8. Closure guard according to claim 1, wherein the first housing part and the second housing part are biased toward their release state by a second resilient element.

9. Closure guard according to claim 8, wherein the second resilient element is a spring.

10. Closure guard according to claim 1, wherein at least one of the first housing part and the second housing part is made of a transparent material at least in some portions.

11. Closure guard according to claim 1, further comprising at least one barb element, which is associated with either the first housing part or the second housing part and is configured to interact with a bead on the neck when the closure guard is in the securing state in such a way as to prevent the closure guard from being pulled off the neck.

12. Closure guard according to claim 11, wherein the barb element is displaceably or pivotably associated with the corresponding housing part and is biased in the direction of the neck by a third resilient element.

13. Closure guard according to claim 1, further comprising a power supply unit.

14. Closure guard according to claim 13, wherein the power supply unit is a battery.

15. Closure guard according to claim 1, further comprising a signal-receiving unit, which is operatively coupled to the actuation element and configured, upon receipt of a release-initiation signal, to instruct the actuation element to displace the locking pin out of engagement with at least one of the first housing part and the second housing part.

16. Closure guard according to claim 1, further comprising a storage unit configured to store information about the bottle to be secured and/or the number of times the actuation element has been actuated and/or further data.

17. Closure guard according to claim 1, further comprising an indicator device on the outside of the first housing part or the second housing part.

18. Closure guard according to claim 1, further comprising at least one sensor unit configured to detect the establishment of the securing state, the release state, and/or a state attached to a bottle, and/or further comprising at least one alarm generator.

19. Closure guard according to claim 1, further comprising an anti-theft element configured to interact with an external anti-theft system.

* * * * *